(12) United States Patent
Cole et al.

(10) Patent No.: US 6,667,257 B2
(45) Date of Patent: Dec. 23, 2003

(54) HEAVY METAL MODIFIED SILICA GLASS FIBERS DOPED WITH THULIUM, HOLMIUM, AND THULIUM-SENSITIZED-HOLMIUM HIGH QUANTUM EFFICIENCIES

(75) Inventors: Brian J. Cole, Arlington, VA (US); Michael L. Dennis, Alexandria, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 8 days.

(21) Appl. No.: 09/967,942

(22) Filed: Oct. 2, 2001

(65) Prior Publication Data

US 2002/0064366 A1 May 30, 2002

Related U.S. Application Data

(60) Provisional application No. 60/236,701, filed on Oct. 2, 2000.

(51) Int. Cl.[7] .......................... C03C 13/04; H04B 10/12
(52) U.S. Cl. ............................. 501/37; 501/54; 501/64; 359/341.5; 359/343; 385/141; 385/142; 385/144
(58) Field of Search ............................. 501/37, 54, 64; 359/341.5, 343; 385/141, 142, 144

(56) References Cited

U.S. PATENT DOCUMENTS

| | | | |
|---|---|---|---|
| 4,962,995 A | 10/1990 | Andrews et al. | 350/96.34 |
| 4,967,416 A | 10/1990 | Esterowitz et al. | 372/6 |
| 5,225,925 A | 7/1993 | Grubb et al. | 359/341 |
| 5,253,322 A | 10/1993 | Onishi et al. | 385/142 |
| 5,426,656 A | 6/1995 | Tohmon et al. | 372/39 |
| 6,077,799 A | 6/2000 | Dejneka et al. | 501/37 |
| 6,128,430 A | 10/2000 | Chu et al. | 385/142 |
| 6,136,736 A * | 10/2000 | Rajaram et al. | 501/54 |
| 6,356,699 B1 * | 3/2002 | Bartholomew et al. | 385/142 |
| 6,599,852 B2 * | 7/2003 | Kondo et al. | 501/42 |

OTHER PUBLICATIONS

Anoykin et al, Erbium–Doped Singel–Mode Fibre Based on SiO2/Ga2O3 Glass, 19th European Conference Optical Communication, Sep. 1993, vol. 2, pp. 189–192.

Brocklesby et al, Non–Radiative Relaxation in Ta–Doped Silica Fibers, Optical Materials, Aug. 3, (1994) pp. 205–208.

Tanabe et al., Spectral Properties of Tm3+–Doped Glasses for S–Band Amplifier, OSA TOPS vol. 60, Optical Amplifiers and their Applications, N.J.Jolley, J.D.Minely, Y.Nakoano, eds. pp. 36–38, Stresa(Italy), Jul., 2001.

Tanabe, Properties of Tm3+–Doped Tellurite Glasses for 1.4um Amplifier, pp. 85–92, Proceedings of SPIE vol. 4282, 1–2001.

Cole et al., S–Band Amplification in a Thulium Doped Silicate Fiber, pp. TiQ3–1TuQ3–3, Technical Digest, vol. 54, Optical Fiber Communication Conference 2001.

Samson et al., Thulium–Doped Silicate Fiber Amplifier at 1460–1520 nm, pp. 247–249, Technical Digest 2000, vol. 44.

Goforth et al., Ultra–Wide Band Erbium Amplifiers Using a Multi–Component Silicate Fiber, pp. 47–53, Technical Proceedings—National Fiber Optic Engineers Conference, 16th, vol 1, Aug. 2000.

Kani et al, Wideband and Flat–Gain Optical Amplification From 4160 to 1510nm By Serial Combination of a Thulium–Doped Fluoride Fibre Amplifier and Fibre Raman Amplifier, Electronics Letters, 1004–1006, vol. 35, No. 12, Jun. 1999.

Optical an Gain Characteristics of High–Concentration Erbium–Doped Fibers on Base of Cesium–Silicate Glasses, OFC'97 Technical Digest, pp. 181–182, 1997.

Wang et al, 1.47, 1.88 and 2.8um Emissions of Tm3+ and Tm3+–Ho3+–Codoped Tellurite Glasses, Journal of Luminescence 60&61 (1994) 145–149.

Arai et al, Aluminum or Phosphorus Co–doping Effect on the Fluorescence and Structural Properties of Neodymium–doped Silica Glass, J. Appl. Phys. 59 (10) May 15, 1986 pp. 3430–3436.

Robinson et al, Co–ordination of Yb3+ In Phosphate, Silica, and Germanate Glasses, J. Phys. Chem. Solids, 1970 vol. 31, pp. 895–904.

Wang et al, Local Structures of Rare–earth Ions in Glasses: The 'Crystal–chemistry' Approach, Journal of Non–Crystalline Solids, 163, (1993), pp. 261–267.

* cited by examiner

Primary Examiner—Karl Group
(74) Attorney, Agent, or Firm—John J. Karasek; Rebecca L. Forman

(57) ABSTRACT

A modified silica glass composition for providing a reduction in the multiphonon quenching for a rare-earth dopant comprising:

$SiO_2$ in a host material;

a rare-earth dopant;

a first $SiO_2$ modifier; and a second $SiO_2$ modifier; such that said first modifier and said second modifier reduce multiphonon quenching of the rare-earth dopant contained therein.

24 Claims, 2 Drawing Sheets

HEAVY METAL MODIFIED SILICA GLASS FIBERS DOPED WITH THULIUM, HOLMIUM, AND THULIUM-SENSITIZED-HOLMIUM HIGH QUANTUM EFFICIENCIES

This application claims the benefit of U.S. Provisional Application No. 60/236,701, filed on Oct. 2, 2000.

BACKGROUND OF THE INVENTION

1. Field of the Invention

The present application relates, generally, to silica glass materials, and, more particularly, to modified rare-earth doped silica glass materials for use in optical fiber amplifiers, ASE sources and lasers.

2. Description of the Related Art

The extraordinary advancement of wide area networking services, e.g., the Internet, over the past several years has been enabled by the confluence of two key technologies, i.e., the erbium doped optical fiber amplifier, EDFA, and wavelength division multiplexing, WDM. Since the discovery by Townsend and Payne in the late 1980's of a method for fabricating high quality rare-earth doped silica fibers, much work has centered on the development of and the exploitation of the EDFA. The typical EDFA consists of $Er^{3+}$ doped into an alumino-silicate glass optical fiber. The developments have revolutionized the telecommunications industry as EDFA has replaced electronic repeaters in fiber based networks. The EDFA coupled with the development of WDM technology has allowed for the engineering of high bandwidth optical systems in the region of 1525 to 1570 nm. This is within the "low-loss" or "third" optical fiber telecommunications window. The low-loss window is the range 1420 nm to 1650 nm where the attenuation per unit length for silica optical fiber is near its minimum, e.g., <0.35 dB/km. The C-band 1525 to 1585 nm, and L-band, 1585 to 1650 nm, are each covered by the EDFA, but it is apparent that these two bands represent a portion of the low-loss region for silica but not the total. Due to the fortunate coincidence of the $Er^{3+}$ gain transition with the low-loss window, the EDFA has come to be extensively used in optical fiber telecommunications systems. The EDFA has also enabled the transmission of enormous quantities of data via WDM, that is, by providing gain simultaneously for multiple data transmission channels at different wavelengths within the bandwidth of the EDFA. To date no practical amplifier has been demonstrated for wavelengths of <1520 nm, so that fully half of the low-loss window bandwidth is unused.

There is a desire for the development of the S-band amplifier. This requires that the rare-earth ion with an appropriate transition have fluorescence in the region of approximately 1450 to 1520 nm. $Tm^{3+}$ has the necessary fluorescence. The relevant transition is $^3H_4$ to $^3F_4$, which fluoresces at 1430–1500 nm. In the absence of nonradiative quenching, the lifetime of the upper level, $^3H_4$, is expected to be approximately, 1.5 ms; this is observed for $Tm^{3+}$ in low phonon energy fluorozirconate glasses. However, the energy separation between $^3H_4$ level and the next lower level, $^3H_5$, is sufficiently small, 4400 $cm^{-1}$, that the upper level is substantially quenched by multiphonon processes in high-phonon energy glasses like the silicates. The lifetime has been measured as <20 $\mu s$ in a pure silica host. Depletion of the upper state lifetime via nonradiative processes reduces the population available to provide gain on the transition of interest. While fiber amplifiers based on this transition have been demonstrated in fluorozirconate glasses, these have proved impractical due to various problems with the host material.

Thulium, Tm, has a $^3H_4$ to $^3F_4$ transition which provided amplification in the S-band wavelength range using a fluorozirconate host. This fluorozirconate material possesses properties that do not lend the material for use in lasers or in optical fibers. These materials are hygroscopic, prone to formation of micro-crystallites over time and have glass transition temperatures at about 400° C. which prevents fusion splicing to standard telecommunications-grade fibers. In the event these glasses are butt spliced they tend to become damaged with heavy pumping.

Although the fluoride and tellurite hosts doped with thulium offer high quantum efficiencies for the 1.47 $\mu m$ transition, some of the material's properties are problematic with respect to making a practical device. Fluoride glasses are very difficult to fabricate into low-loss fiber due to a propensity towards crystallization and suffer from poor chemical durability. Tellurite glasses, although stable, have a high index of refraction and high thermal expansion, which complicates splicing into an all-optical system.

With the advent of new silica fibers with low-loss across the entire region of 1200 to 1600 nm, i.e., <0.35 dB/km, optical amplifiers that can potentially amplify at other wavelengths within this region are increased importance.

Silica host materials do have both good chemical and mechanical properties, e.g., fusion splicing to the silicates, high mechanical strength, high glass transition temperature, and extremely low thermal expansion. However, doping silica materials with $Tm^{3+}$ has low fluorescence and high phonon quenching and therefore not practical for use in optical fiber systems.

SUMMARY OF THE INVENTION

Accordingly, it is an object of the present invention to provide a silica glass material doped with $Tm^{3+}$, $Ho^{3+}$, and $Tm^{3+}$-sensitized-$Ho^{3+}$ in which the material has reduction in the multiphonon quenching compared to the multiphonon quenching of pure silicates.

It is a further object of the present invention to maximize the lifetime of the radiating ions in the $^3H_4$ level for thulium in silica.

It is a further object of the present invention to prepare a glass material that can be fusion spliced directly to conventional silica fibers.

It is a further object of the present invention to prepare a doped glass material that can be used as an amplifier.

It is a further object of the present invention is to improve the efficiency of fluorescence for a doped silica glass.

It is still a further object of the present invention to increase the fluorescence quantum efficiencies for the 1.47 $\mu m$ transition for a $Tm^{3+}$ doped silica glass material.

It is yet a further object of the invention is to provide a silica glass composition that provides fluorescence in the S-band region of approximately 1450 to 1520 nm.

It is a further object of this invention to provide silica glass dopant with holmium and thulium sensitized holmium that exhibits improved radiative efficiency.

It is a further object of this invention to use the modified silica glass composition as a laser, an amplifier and ASE source.

These and additional objects of the invention are accomplished by the structures and processes hereinafter described.

The present invention relates to a modified silica glass providing a reduction in the multiphonon quenching for a rare-earth dopant that contains: $SiO_2$ in a host material; a rare-earth oxide dopant selected from the group consisting of $Tm^{3+}$, $Ho^{3+}$ and $Tm^{3+}$ sensitized—$Ho^{3+}$; a first $SiO_2$ modifier; in which the first modifier is a 3+ cation dopant, and the first modifier is selected from the group consisting of Ga, Y and combinations thereof such that the first modifier reduces multiphonon quenching of the rare-earth dopant contained therein.

The present invention in another aspect of the composition is made by made by combining: between about 70 and about 99 molar percent $SiO_2$ in a host material; between about 100 and about 100,000 ppm by weight of a rare-earth oxide dopant selected from the group consisting of Thulium, Holmium and Thulium-sensitized-Holmium; between about 0.1 and about 20 molar percent of a first modifier; and between about 0.1 and about 10 molar percent of a second modifier; such that the first and second modifiers reduce multiphonon quenching of the rare-earth contained therein.

The present invention is another aspect a silica glass composition containing rare-earth dopant and at least one modifier selected from the group consisting of Ga, Y and combinations thereof which is suitable to reduce multiphonon quenching for the rare-earth dopant so that the rare-earth dopant permits significant emission at a wavelength between about 1.4 to about 2.0 $\mu$m when pumped.

BRIEF DESCRIPTION OF THE DRAWINGS

A more complete appreciation of the invention will be readily obtained by reference to the following Description of the Preferred Embodiments and accompanying drawings in which like numerals in different figures represent the same structures or elements, wherein.

DESCRIPTION OF THE PREFERRED EMBODIMENTS

Glass has no long-range order so that is atomic arrangement is characterized by an extended three-dimensional structure which lack symmetry and periodicity, W. H. Zachariasen, J. Am. Chem Soc., 54 (1932), 3841. There is a short range order mainly attributed to local order around structural elements. Most of the elements are covalently bonded with strong directional bonds, i.e., a tetrahedron. Structural modifying elements which adjust the connectivity and the dimensionalily of the structural have weak, ionic and non-directional bonds. Their coordination environments are traditionally considered to be more distorted and variable than in crystals, and their spatial distributions are regarded as random or homogeneous. This view of the structure of glass is known as the "continuous-random-network", CNR, theory.

Some have challenged the CNR theory with a new theory, modified-random-network, MRN. The MRN theory states that the immediate environment of the glass-modifying cation is found to be rather more well-defined than would be predicted by the conventional CRN. The glass modifiers are found not to be spread uniformly throughout the glass, but rather to adopt a non-random and inhomogeneous distribution in glass leading to "pools" with modifier-rich regions or separate glass-former-rich regions. See, Wang, J., Journal of Non-Crystalline Solids, 163, pp. 26–267, 1993.

Adding small amounts of aluminum to a $SiO_2$ matrix results spectroscopically in the rare earth assuming an aluminum rich local environment. Replacing Al with Ga can lead to an improvement in efficiency. Because the mass for Ga (MW 69.72) is heavier compared to Al (MW 26.98), surrounding the rare earth element with Ga instead of Al can result in significant reduction in multiphonon quenching.

Figure 1:
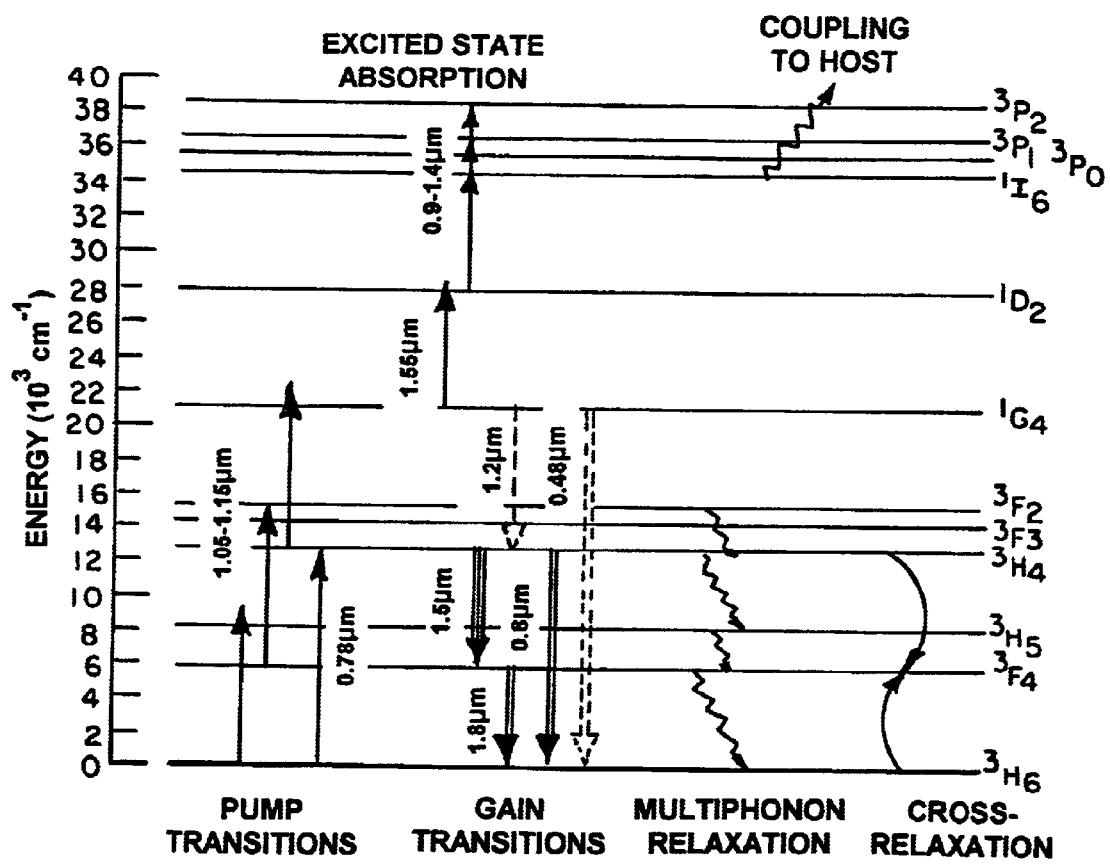
FIG. 1 illustrates the energy level diagram for $Tm^{3+}$.

FIG. 1 illustrates the energy level diagram for thulium with the fluorescence for the $^3H_4$-$^3F_4$ transition. The upper $^3H_4$ level has a closely lying lower $^3H_5$ level that results in significant multiphonon quenching when doped into a host with high phonon energy. The multiphonon relaxation is a process where the excited rare earth ion has a coupling to the phonon, lattice vibrations, of the host material. This process results in a decrease in fluorescence efficiency. In general, a reduction of the highest energy phonon for the glass matrix will result in increased fluorescence efficiencies for rare earth ions.

Using solution chemistry as a model, the $SiO_2$ network is poor a solvent for rare earth ions. 3+ cation dopants and/or 5+ cation dopants and/or 4+ cation dopants solublize the rare earth dopant, e.g., $Tm^{3+}$, in the silica. Both the 3+, 4+, and 5+ cations are modifiers in the silica glass and therefore become part of the iso-structure of the network, i.e., they are incorporated into the local bonding configuration of the tetrahedral. When $Tm^{3+}$ is added to the structure the 3+ and/or 4+ and/or 5+ cation dopants solublize the $Tm^{3+}$, i.e., a large fraction of the $Tm^{3+}$ or other rare-earth dopants are in an environment where dopants are not influenced by the high-energy vibrations of the silica glass. Thus, the vibration energy associated with the modifiers-silica bond is significantly lower than that of the host glass, so that the nonradiative decay from the Tm3+ or other rare-earth ion, i.e., Holmium, and Thulium-sensitized-Holmium, is reduced. This solubilizing lowers the multiphonon quenching of the Tm3+ so that the photons radiate from the $^3H_4$ to $^3F_5$ without the loss of many phonon relaxing from the $^3H_4$ to the $^3H_5$ level. The photons for Tm-2 $\mu$m, specifically 1.8 to 2.0 $\mu$m, radiate from $^3F_4$ to $^3H_6$, for Holmium-2 $\mu$m energy transfer is from $^5I_7$ to $^5I_8$, and for Thulium-sensitized-Holmium-pumped Thulium energy transfer from Tm $^3F_4$ level to Ho $^5I_7$, Holmium emission $^5I_7$ to $^5I_8$ at about 2 $\mu$m.

$Tm_2O_3$ contains a rare earth element that radiates in the S-band, 1420–1525 nm. A concentration of from about 100 ppm to about 100,000 ppm by weight of the oxide is added to the silica glass. Holmium and thulium-sensitized-holmium are also dopants that are possible in the silica glass. A concentration of from about 100 ppm to about 100,000 ppm by weight of the oxide is added to the silica glass.

There is at least one cation that is desired as modifiers of the silica glass structure. The first modifier is a 3+ cation having a concentration of from about 0.1 to about 20 molar %. Examples of the first modifier are Ga, Y and combinations of the two. A second modifier is a 5+ cation having a concentration of from about 0 to about 10 molar percent and can also be added. Examples of the second modifier are Ta, Bi and combinations thereof. The preferred embodiment will contain a first and a second modifier. When the second modifier is present, the concentration is between about 0.1 to about 10 molar percent.

It is realized that simple permutations of this patent can take place without substantially changing the core idea. For example, 4+ cations such as Ge and Sn can be substituted into the structure for the Si ion. The motivation for this substitution may be to increase the photosensitivity for the core glass. As these 4+ cations are of heavier mass compared to the Si so that they have the additional beneficial property of further reducing the overall phonon energy for the host material.

Although, not wanting to be held to a theory, it is thought that the first modifier, e.g., Ga, will solublize the rare-earth resulting in improved radiative efficiency for the rare-earth. The theory of solubilization is similar to the use of a surfactant for solubilizing oil in water. The rare-earth is soluble in the modifier rich regions and the modifiers are soluble in the silica.

$SiO_2$ is found in the glass and has a concentration of from about 70 to about 99 molar percent.

To determine the concentration, one, typically, has to make up a bulk standard of a similar composition to the fiberoptic that is desired. Then, the absorption is measured as a function of the length in this standard with a known concentration of a rare-earth. Then one makes the fiberoptic containing an unknown quantity of the rare-earth. One then measures the absorption of the rare-earth as a function of the length in the fiberoptic and then uses the standard to back-calculate the concentration. For host glass there are an array of characterization techniques to identify the composition. The simplest way to determine the composition of the glass is X-ray analysis. Thus, to determine the concentration of the silica and the first, second and third modifiers is by using X-ray analysis.

The cross-section of the center of the glass core has a core diameter and the rare-earth ions are substantially contained within a volume of glass core having a cross section whose diameter is equal to or less than that of the core diameter. The optical fiber, laser and ASE source can contain a single mode core composition of the modified rare-earth doped silica glass composition of the present invention. There can also be a multimode core which surrounds the glass core and one or more claddings which surround the multimode core. The multimode core has a non-circular cross-section. The laser, the optical fiber amplifier and the ASE device can have the diode radiation side-pumped into the optical fiber.

The glasses and fibers of this invention are typically made by a modified CVD (MCVD) technique. This technique is analogous to the organo-metallic CVD technique known in the semiconductor industry, Erbium-Doped Fiber Amplifiers: Fundamentals and Technology, Becker, P. C., et al., 1999, and Rare-Earth-Doped Lasers and Amplifiers, Digonnet, M. J. F. Since this is a non-equilibrium process, glasses made by this technique will not necessarily have the same stoichiometry as the starting components. Typically, compositions are determined spectroscopically or by measuring some property of the glass (e.g., index of refraction) that varies predictably with composition.

Having described the invention, the following examples are given to illustrate specific applications of the invention, including the best mode now known to perform the invention. The specific examples are not intended to limit the scope of the invention described in this application.

EXAMPLE

A gallium doped silica preform doped with thulium was fabricated using MCVD. An all vapor process was used where gallium chloride and rare-earth chelate were transported to the MCVD reaction zone via a heated injection assembly. The MCVD/chelate injection tube assembly used is similar to that outlined in the article by Tumminelli, R. P. et al., "Fabrication of high concentration rare-earth doped opticalfibers using chelates", J. Lightwave Tech., vol 8, no. 11, 1990, p. 1680.

The following flow conditions were used:
$SiCl_4$: (bubbler T=25° C.) 20 sccm (standard cubic centimeter per minute)
$GaCl_3$ (bubbler T=180° C.) 200 sccm
$Tm(TMHD)_3$ (bubbler T=170° C.) 30 sccm
$O_2$:800 sccm
He: 800 sccm 5 grams of $GaCl_3$ was loaded into a quartz bubbler and heated to 180° C. About 10 g of Tm chelate was dispersed in $SiO_2$ sand, loaded into a quartz bubbler, and heated to 170° C. These were connected to the heated injection tube assembly. A 16 mm×20 mm substrate tube was used for the MCVD process.

The gallosilicate core was deposited in the following manner. The 20 sccm of $SiCl_4$ was sent to the MCVD reaction zone. The $GaCl_3$ (T=180° C.) was then sent to the reaction zone. When a stable reaction zone was established, the Tm chelate then introduced to the MCVD reaction zone. A relatively small flow rate for the Tm was used to dope a low concentration of rare-earth into the glass. This was to minimize any ion—ion interactions that could complicate subsequent spectroscopy.

Two passes were deposited under these initial conditions. For the third core deposition pass, the temperature for the $GaCl_3$ bubbler was increased to 210° C. After three core pass depositions, the tube was collapsed into a preform by standard MCVD techniques.

Figure 2:
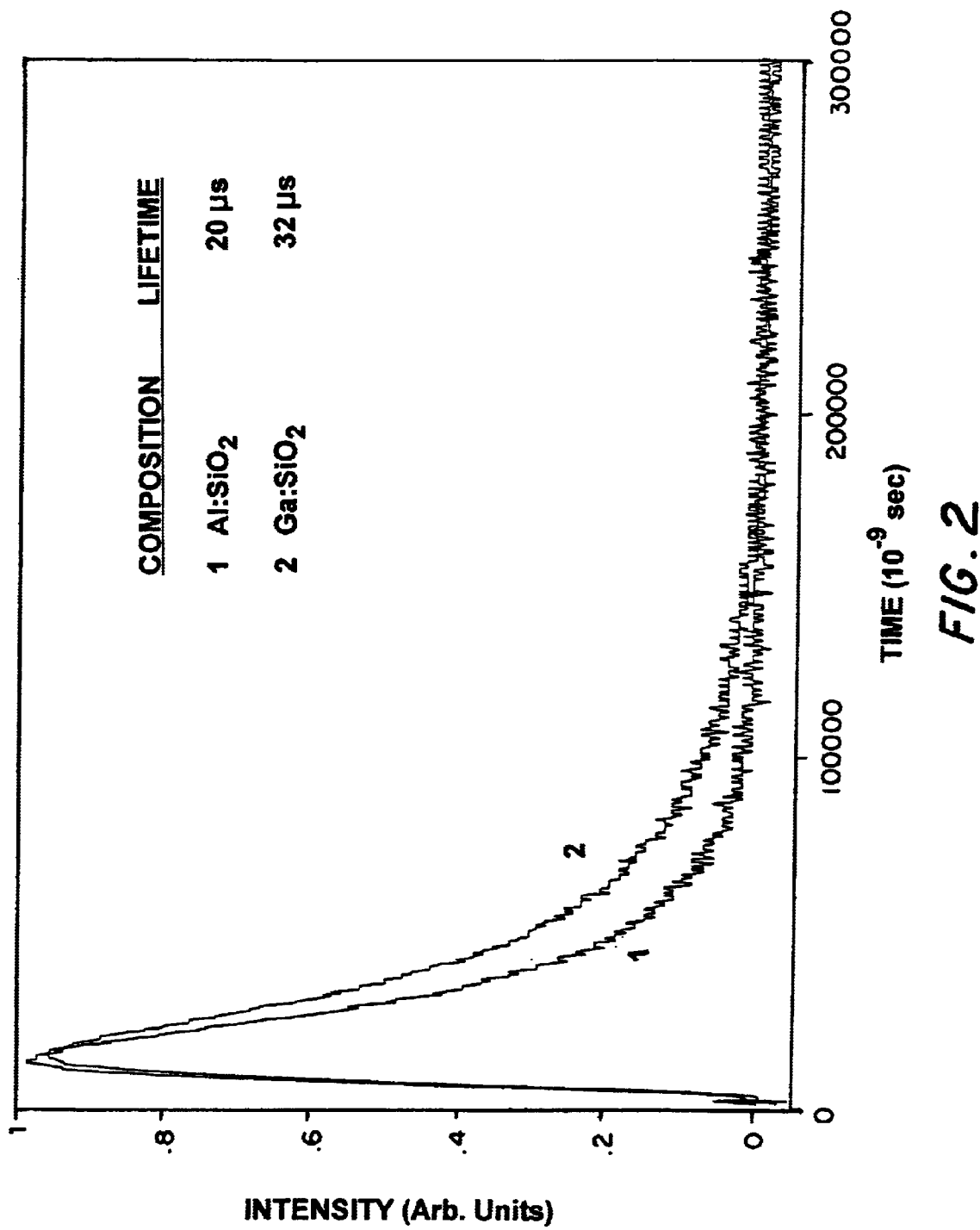
FIG. 2 illustrates the fluorescence decay for $^3H_4$ for $Tm^{3+}$.

The index difference due to gallium was measured to be 0.005 corresponding to an NA~0.10. The $^3H_4$ lifetime for $Tm^{3+}$ in this preform measured 32.3 $\mu$s. (For comparison purposes, the lifetime for Tm—Al—$SiO_2$ is 20 $\mu$s.) FIG. 2 illustrates the decay for Thulium in the Gallo-silicate host compared to the alumino-silicate host. These samples were excited using a pulsed ti-sapphire laser operating around 770 nm. The fluorescence was passed through a monochromator to separate the pump from the decay. The decay for $^3H_4$ was measured around 800 nm. There is a measurable improvement in the lifetime for the Tm:Gallo-silicate host compared to the alumino-silicate. This is evidence of the heavier massed Gallium solubilizing the rare-earth ion resulting in a decrease in the multiphonon relaxation rate.

Obviously, many modifications and variations of the present invention are possible in light of the above teachings. It is therefore to be understood that, within the scope of the appended claims, the invention may be practiced otherwise than as specifically described.

What is claimed is:

1. A modified silica glass providing a reduction in the multiphonon quenching for a rare-earth dopant comprising:
   $SiO_2$ in a host material;
   a rare-earth dopant selected from the group consisting of $Tm^{3+}$, $Ho^{3+}$ and $Tm^{3+}$sensitized—$Ho^{3+}$;
   a first $SiO_2$ modifier;
      wherein said first modifier is a 3+cation dopant, and
      wherein said first modifier is selected from the group consisting of Ga, Y and combinations thereof such that said first modifier reduces multiphonon quenching of said rare-earth dopant contained therein.

2. The modified silica glass of claim 1 further comprising:
   a second $SiO_2$ modifier;
      wherein said second modifier concentration is between about 0.1 and about 10 molar percent such that said first modifier and said second modifier reduce multiphonon quenching of said rare-earth dopant contained therein.

3. The modified silica glass of claim 1,
   wherein said $SiO_2$ concentration is between about 70 and about 99 molar percent;
   wherein said rare-earth concentration is between about 100 and about 100,000 ppm by weight; and wherein said first modifier concentration is between about 0.1 and about 20 molar percent.

4. The modified silica glass of claim 2, wherein said second modifier is a 5+cation dopant.

5. The modified silica glass of claim 2, wherein said second modifier is selected from the group consisting of $Ta^{5+}$, $Bi^{5+}$ and combinations thereof.

6. The modified silica glass of claim 2, wherein said composition comprises: $SiO_2$, a rare-earth dopant, $Y^{3+}$, $Ga^{3+}$, $Ta^{5+}$ and $Bi^{3+}$.

7. The modified silica glass of claim 2, wherein said composition comprises:

$SiO_2$, rare-earth dopant, $Y^{3+}$ and $Ta^{5+}$.

8. The modified silica glass of claim 2, wherein said composition comprises:

$SiO_2$, rare-earth dopant, $Ga^{3+}$ and $Bi^{5+}$.

9. The modified silica glass of claim 2, wherein said composition comprises:

$SiO_2$, rare-earth dopant, $Y^{3+}$ and $Bi^{5+}$.

10. The modified silica glass of claim 2, wherein said composition comprises:

$SiO_2$, rare-earth dopant, $Ga^{3+}$ and $Ta^{5+}$.

11. An optical fiber comprising said composition of claim 1.

12. The optical fiber of claim 11, wherein said optical fiber comprises a single mode core and further comprising a multimode core surrounding said single mode core and at least one cladding surrounding said multimode core.

13. The optical fiber of claim 12, wherein said multimode core has a non-circular cross-section.

14. The optical fiber of claim 13, wherein said optical fiber is side-pumped by a diode radiation.

15. A laser having an optical fiber comprising said composition of claim 1.

16. The laser of claim 15, wherein said optical fiber comprises a single mode core and further comprising a multimode core surrounding said single mode core and at least one cladding surrounding said multimode core.

17. The laser of claim 16, wherein said multimode core has a non-circular cross-section.

18. The laser of claim 17, wherein said optical fiber is side-pumped by a diode radiation.

19. An ASE source comprising said composition of claim 1.

20. The ASE source of claim 19 having an optical fiber comprising said composition of claim 1.

21. The ASE source of claim 20, wherein said optical fiber comprises a single mode core and further comprising a multimode core surrounding said single mode core and at least one cladding surrounding said multimode core.

22. The ASE source of claim 21, wherein said multimode core has a non-circular cross-section.

23. The ASE source of claim 22, wherein said optical fiber is side-pumped by a diode radiation.

24. A composition made by combining:

between about 70 and about 99 molar percent $SiO_2$;

between about 100 and about 100,000 ppm by weight of a rare-earth dopant selected from the group consisting of thulium, holmium and thulium-sensitized-holmium;

between about 0.1 and about 20 molar percent of a first modifier; and between about 0.1 and about 10 molar percent of a second modifier;

such that said first and second modifiers reduce multiphonon quenching of said rare-earth contained therein wherein said first modifier is selected from the group consisting of Ga, Y and combinations thereof which is suitable to reduce multiphonon quenching for said rare-earth dopant so that said rare-earth dopant permits significant emission at a wavelength between about 1.4 to about 2.0 $\mu$m when pumped.

* * * * *

UNITED STATES PATENT AND TRADEMARK OFFICE
CERTIFICATE OF CORRECTION

PATENT NO.    : 6,667,257 B2  
DATED         : December 23, 2003  
INVENTOR(S)   : Brian J. Cole and Michael L. Dennis It is certified that error appears in the above-identified patent and that said Letters Patent is hereby corrected as shown below:

Column 2,
Lines 48 and 53, delete the second instance of "is", which is immediately following the word "invention".

Column 3, line 65 through Col. 4, line 4,
Delete the paragraph.

Column 6,
Line 46, delete "in a host material".

Signed and Sealed this

Fifteenth Day of June, 2004

JON W. DUDAS
*Acting Director of the United States Patent and Trademark Office*